United States Patent

Steuer

[11] 4,179,844
[45] Dec. 25, 1979

[54] HINGE

[75] Inventor: Paul R. Steuer, Cheltenham, Pa.

[73] Assignee: Young Windows Inc., Conshohocken, Pa.

[21] Appl. No.: 920,651

[22] Filed: Jun. 30, 1978

[51] Int. Cl.² .................. E05D 1/06; E05D 7/10
[52] U.S. Cl. .................................. 16/171; 16/180; 16/DIG. 6; 16/DIG. 36; 220/342
[58] Field of Search .............. 16/171, 180, DIG. 6, 16/128 R, 142, 145, DIG. 29, DIG. 36; 220/342, 343

[56] References Cited
U.S. PATENT DOCUMENTS

| | | | |
|---|---|---|---|
| 1,154,538 | 9/1915 | Offutt, Sr. | 16/180 |
| 2,810,153 | 10/1957 | Semar | 16/180 |
| 2,923,429 | 2/1960 | Schneider | 16/171 X |
| 3,088,162 | 5/1963 | Robbins | 16/180 |
| 3,092,870 | 6/1963 | Baer | 16/180 X |
| 3,370,317 | 2/1968 | Marchione | 16/180 X |
| 3,722,030 | 3/1973 | Smith | 16/180 X |
| 3,863,372 | 2/1975 | Stilling | 16/171 X |

Primary Examiner—Werner H. Schroeder
Assistant Examiner—Moshe I. Cohen
Attorney, Agent, or Firm—Frederick J. Olsson

[57] ABSTRACT

Anti-rattle, disengagable hinge comprising two members respectively having mating concave and convex surfaces held together by wire-form spring. Spring prevents rattle but allows relative sliding motion of surfaces over an arc. Surfaces can be disengaged at one end of the arc.

3 Claims, 8 Drawing Figures

HINGE

This invention relates to hinges for supporting closures which can be quickly separated and reconnected at some desired rotational position.

The invention finds special utility in those applications wherein anti-rattle and quick removability characteristics are highly desired and further in those applications not only having the above characteristics but in addition needs to be corrosion proof.

A roof vent for a van is typical representative example of an application requiring the above mentioned features and the invention will be explained in connection therewith.

Referring to the drawings.

Figure 2:
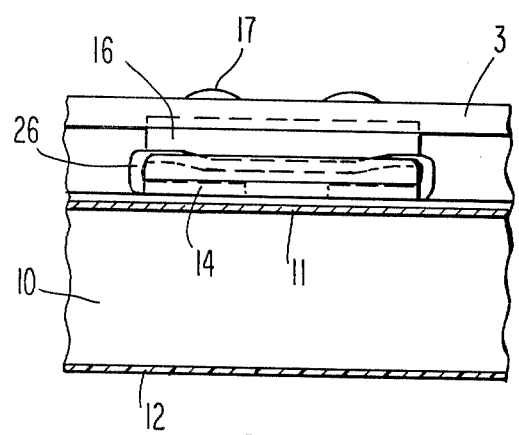
FIG. 2 is a view taken along the lines 2—2 of FIG. 1.
Figure 1:
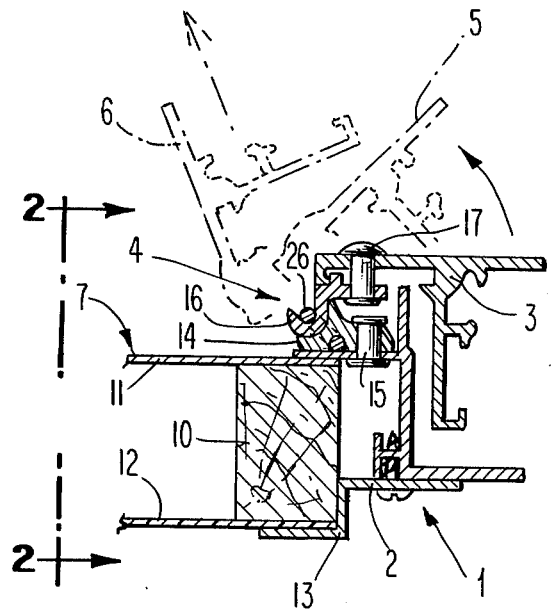
FIG. 1 is an elevational view of a hinge of the invention as set-up in a van roof vent.

In FIG. 1 a van roof vent 1 includes a mounting frame 2 and a vent frame 3 which are connected by the hinge structure 4. The vent frame is connected to an operator not shown which can move the vent and as between the closed position as shown to fully open position indicated by the dotted lines 5 or to any intermediate open position. When the operator is released from or disconnected from the vent frame, the same can be rotated by hand to the position noted by the dotted lines 6 and then removed as will be explained later.

Typical vent of the kind in question is shown in copending application Ser. No. 733,430 filed Oct. 18, 1976 and entitled IMPROVED VENT, and assigned to the assignee of this invention.

The mounting frame 2 is connected to the roof 7 of the van. For this purpose a spacer 10 is disposed between the roof panel 11 and the headliner 12. The trim piece 13 of the mounting frame 2 captures the roof panel, the spacer and headliner between the frame 2 and locks the same in position.

The hinge 4 has a first member or guide section 14 which is riveted into the mounting frame as by the rivets 15 and second or follower section 16 to which is riveted the vent frame 3 as by the rivets 17. The members 14 and 16 are aluminum extrusions and the cross-sectional shapes are shown clearly in FIGS. 3 and 4. Aluminum avoids corrosion due to usual atmospheric exposure.

A member 14 has an elongated body 20 by which it is secured to the mounting frame 2. A slot 21 is co-extensive with the body The body extends upwardly and is formed with a concave semi-circular surface 22.

The member 16 has an elongated body 23 by means of which it is secured to the vent frame 1. The body extends downwardly and is formed with the semi-circular surface 24 and a slot 25 both of which are co-extensive with the body. The surface 24 has the same radius as the surface 22.

Figure 4:
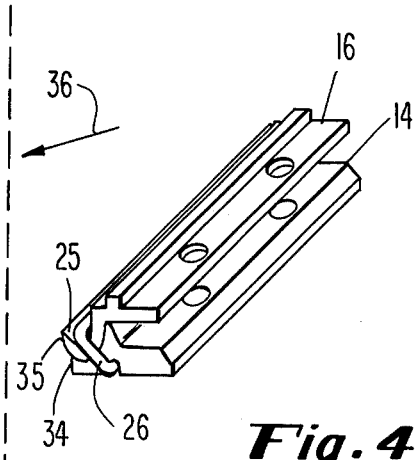
FIG. 4 is a perspective view of the parts of FIG. 3 assembled together.

The surfaces 22 and 24 are adapted to engage one another and as noted in FIGS. 1 and 4 make a snug, sliding fit. For operational purposes, i.e. when the vent frame is closed or in some open position the two surfaces are maintained in engagement by a spring 26. Likewise, when the vent frame 3 is moving its surface 24 slides over or rotates relative to the surface 22 and the surfaces are maintained in engagement during rotation by the spring 26. In the closed position of FIG. 1 and in any open position the forces developed by the spring prevents separation of the surfaces 22 and 24 and thus prevents rattle developing at the hinge joint and as between the mounting frame 2 and vent frame 3.

Figure 3:
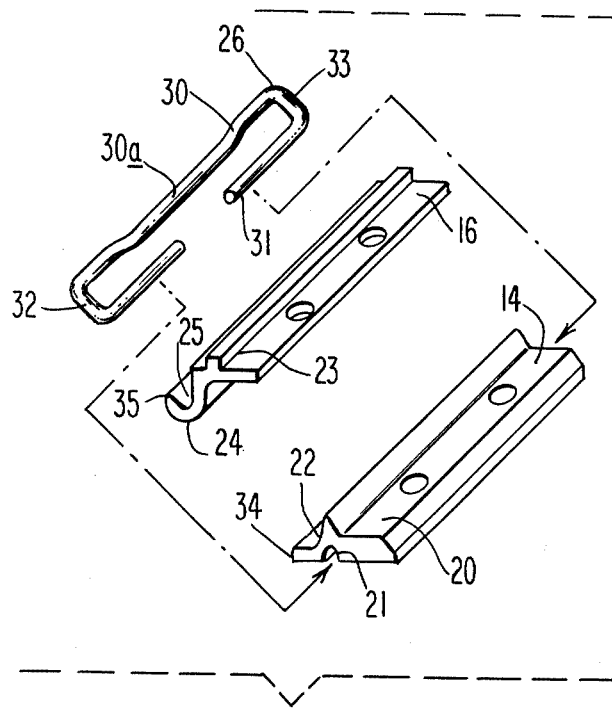
FIG. 3 is a exploded, perspective view of certain parts of the hinge of FIG. 1.

The spring 26 is a steel wire-form and is generally rectangular in shape and has a compression section 30 and a compression section 31 which are connected by the end sections 32 and 33. The compression section 30 is disposed in the slot 25 and the compression section 31 is disposed in the slot 21. As noted, the compression section 30 is continuous whereas the compression section 31 is discontinuous. As best seen in FIG. 3, the compression section 30 has a slight inward bend as at 30a. The spring is made of stainless spring steel to avoid corrosion.

For assembling the hinge 4, the spring 26 is positioned at the edge 34 (FIG. 3) with the compression section 30 adjacent the lower end of the surface 22 and the compression section 31 adjacent the underside of the body 20. The spring is then pushed to the right so that the compression section 30 slips onto the concave surface 22 and the compression section 31 slips into the slot 21. The fact that the compression section 31 is discontinuous provides for some yield in the spring and aids in the assembly process. To engage the member 16, the same is put in a position 180° from that shown in FIG. 3 with the edge 35 between the compression section 30 and the concave surface 22. The compression section 31 can be pushed upwardly in the slot 21 to increase the distance between the concave surface 22 and the compression section 30. The member 16 is then urged or rotated so that the edge 35 goes down in between the concave surfaces 22 and the compression section 30. With further rotation the concave and convex surfaces 22 and 24 are fully engaged with one another.

To disengage the member 16 it is rotated counter clockwise until the edge 35 reaches the position wherein it is free from the surface 22 and the compression section 30.

From the foregoing, it will be apparent that the members 14 and 16 can relatively rotate with respect to one another about a predetermined arc and that the members can be separated at the end of the arc.

As employed in a van roof vent, the hinge has the additional advantage that engagement and disengagement of the vent is very easily carried out from inside the van because the parts are readily visable.

Referring to FIG. 3, one standing inside the van and rotating the vent 3 upwardly views the hinge in the direction of the arrows 36. Thus with the vent frame titled to the position indicated by the dotted lines 6 in FIG. 1, the portion 37 adjacent the edge 35 comes into view. With slight upward motion the disengagement is effected and the compression section 30 is visible. Thus for reconnection, the vent frame can be manipulated to place the edge 35 adjacent the space between the compression section 30 and the concave surface 22 and then forced down into the space. Then with rotation of the vent frame, the surfaces 22 and 24 engage as previously described.

Referring to FIG. 1, it will be noted that the compression section in the slot 21 is visible from the outside. For security reasons, it is preferable to have the continuous compression section in the slot 21 to avoid the possibility of the spring being separated as might be done if the discontinuous compression section were in the slot 21.

Figure 5:
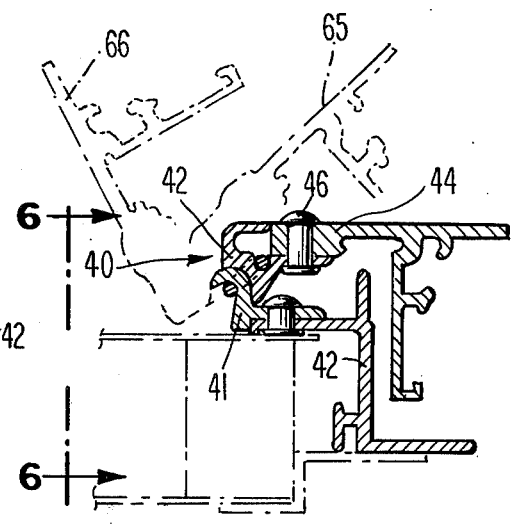
FIG. 5 is an elevational view of another embodiment of the hinge of the invention as set-up in a van roof vent.
Figure 7:
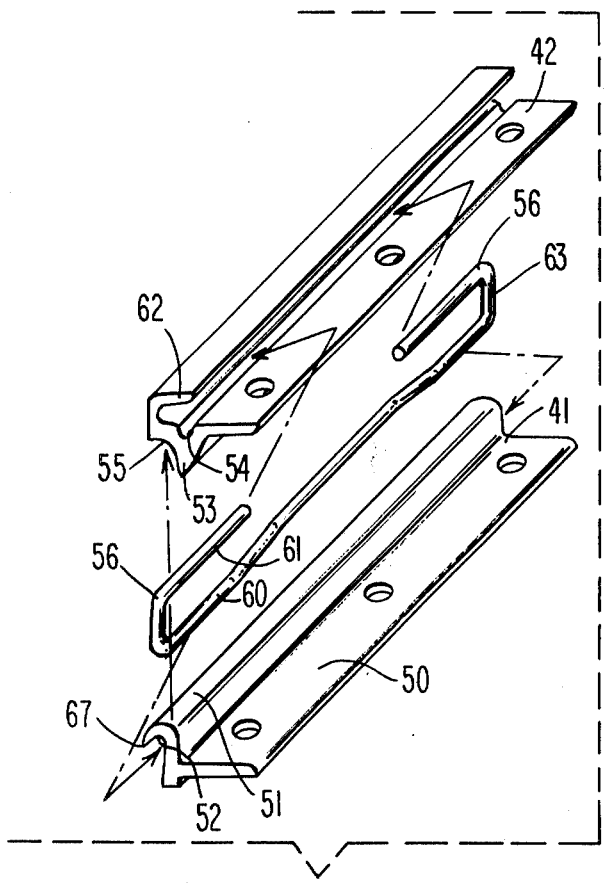
FIG. 7 is an exploded view of certain components of the hinge of FIG. 1.
Figure 8:
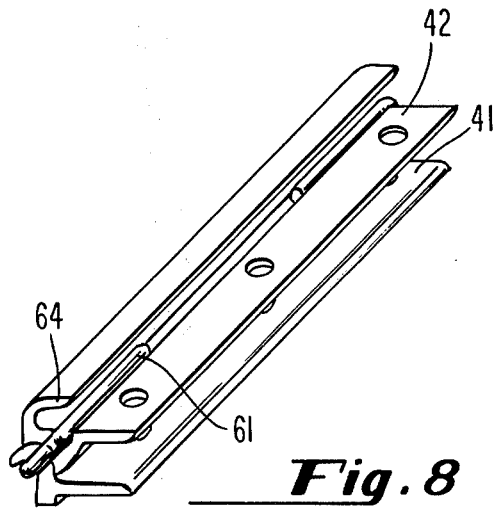
FIG. 8 is a perspective view of the parts of FIG. 7 assembled together.

In FIGS. 5, 5, 7 and 8 I have illustrated a hinge similar to the hinge of FIGS. 1 and 4 but with the concave and convex surfaces reversed in position.

The hinge 40 has a first member or guide section 41 which is secured to the mounting frame as by the rivets 43 and a second member or follower 44 to which is secured the vent 45 as by rivet 46. The members 41 and 44 are aluminum extrusions the cross sections of which are shown in FIGS. 7 and 8.

The member 41 has an elongated body 50 by which it is secured to the mounting frame 42. The body extends upwardly and is formed with convex surface 51 and slot 52 which are co-extensive with the body.

The member 44 has an elongated body 53 by which it is secured to the vent frame 45. A slot 54 is co-extensive with the body. The body extends downwardly and is formed with a concave surface 55 of the same radius as the surface 51.

The surfaces 51 and 55 engage one another as in FIGS. 5 and 8. The surfaces make a snug, but sliding fit.

A stainless steel, wire-form spring 55 is similar to the spring 26 and has compression sections 60 and 61 which are respectively connected by the end sections 62 and 63. The section 60 fits into the slot 52 and the section 61 fits into the slot 54.

The surfaces 51 and 55 and the spring and the spring 56 have the same features and function in the same manner as described for the surfaces 22 and 24 and spring 26.

In the embodiment of FIG. 5, the discontinuous compression section 61 is disposed in the slot 54. In order to avoid unwanted separation of the spring, the body 44 has a shield 64 which extends over and protects the section 61.

For purposes of assembly, the spring 56 is slipped over the shield 62 so that the section 61 is in the slot 54 and the section 62 is aligned with the concave surface 55.

Figure 6:
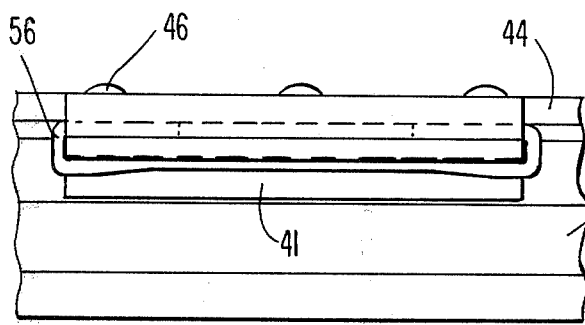
FIG. 6 is an elevational view taken along the lines 5—5 of FIG. 4.

The body 50 is positioned 180° from the position of FIG. 6 with the edge 63 between the compression section 62 at the surface 55. The body is rotated clockwise to effect the assembly. The hinge 40 in FIG. 5 is shown in the closed position. An operator not shown can move the vent frame 45 from the closed position to the fully open position indicated by dotted lines 65 or to any intermediate open position. When the operator is disconnected, the vent frame can be rotated by hand to the position indicated by the dotted lines 66 for disengagement.

Reconnection of the vent frame 45 is accomplished by placing the compression section 60 adjacent the edge 67 (FIG. 7) and forcing the edge in between the compression section 60 and the convex surface 51 and then rotating the vent frame so that the surfaces 51 and 55 fully engage.

I claim:

1. A hinge to be connected between two parts and provide for relative rotation of the same and to hold the parts so as to avoid rattle and at a predetermined rotational position to permit the parts to be separated, the hinge comprising:

a first elongated member having means for connecting the same to one of the parts to be rotated and having spring retaining means;

a second elongated member having means for connecting the same to the other of the parts to be rotated and having spring retaining means;

means on one member forming a semi-circular concave surface;

means on the other member forming a semi-circular convex surface, the surfaces slidingly engaging one another; and wire-form spring means elongated and generally rectangular in shape and having a pair of spaced apart compression sections extending along the lengthwise direction of the spring means and having end sections respectively extending between the compression sections and closely adjacent opposite edges of said members and preventing axial separation of the members, one compression section engaging said spring retaining means on said first member and the other compression section engaging said spring retaining means on second member and the sections developing forces urging the convex and concave surface towards one another, said surfaces and said forces providing for the surfaces to tightly and slidingly engage without separation to thereby avoid rattle and for the members to relatively rotate over a predetermined arc without separation and for the surfaces to be separated by movement of the members in a radial direction at one end of the arc whereby to separate the members.

2. The hinge of claim 1 wherein one of said compression sections is discontinuous.

3. The hinge of claim 1 wherein each of said members is an aluminum extrusion and said spring is formed of stainless steel wire.

* * * * *